United States Patent [19]

Ikebe et al.

[11] Patent Number: 5,524,005
[45] Date of Patent: Jun. 4, 1996

[54] CARTRIDGE FOR A RECORDING REPRODUCING MEDIUM HAVING A SHUTTER CONFIGURED TO REDUCE DAMAGE TO THE CASING

[75] Inventors: Masaru Ikebe, Saku; Haruo Shiba, Komoro; Yukio Miyazaki, Saku, all of Japan

[73] Assignee: TDK Corporation, Tokyo, Japan

[21] Appl. No.: 400,497

[22] Filed: Mar. 8, 1995

Related U.S. Application Data

[63] Continuation of Ser. No. 111,156, Aug. 24, 1993, abandoned.

[30] Foreign Application Priority Data

Aug. 24, 1992 [JP] Japan ..................... 4-246041
Aug. 24, 1992 [JP] Japan ..................... 4-246042

[51] Int. Cl.⁶ .................................. G11B 23/00
[52] U.S. Cl. ................. 369/291; 360/132; 360/133
[58] Field of Search ..................... 360/133, 132; 369/291, 289–290

[56] References Cited

U.S. PATENT DOCUMENTS

| | | | |
|---|---|---|---|
| 4,876,619 | 10/1989 | Suzuki | 360/133 |
| 5,226,035 | 7/1993 | Kato et al. | 360/133 |
| 5,233,494 | 8/1993 | Kikuchi | 360/133 |

FOREIGN PATENT DOCUMENTS

| | | |
|---|---|---|
| 0163293 | 12/1985 | European Pat. Off. . |
| 0219980 | 4/1987 | European Pat. Off. . |
| 0244132 | 11/1987 | European Pat. Off. . |
| 0273983 | 7/1988 | European Pat. Off. . |
| 0343844 | 11/1989 | European Pat. Off. . |
| 0411670 | 2/1991 | European Pat. Off. ......... 369/291 |
| 61-170972 | 8/1986 | Japan . |
| 2239447 | 7/1991 | United Kingdom . |
| 2263686 | 8/1993 | United Kingdom . |

*Primary Examiner*—Stuart S. Levy
*Assistant Examiner*—Brian E. Miller
*Attorney, Agent, or Firm*—Oblon, Spivak, McClelland, Maier & Neustadt

[57] ABSTRACT

A cartridge for a recording/reproducing medium has a shutter for opening and closing a window opening formed in a casing in which a projection or a gate formed at an outer edge of the shutter is provided not to project from the outer edge. The post-treatment of the gate can be easy to improve productivity, the stroke range of the shutter can be precisely determined; the mounting and dismounting of the shutter on a recording/reproducing device as well as the sliding movement of the shutter is smooth. Further, the quality of the cartridge is improved.

4 Claims, 13 Drawing Sheets

CARTRIDGE FOR A RECORDING REPRODUCING MEDIUM HAVING A SHUTTER CONFIGURED TO REDUCE DAMAGE TO THE CASING

This application is a continuation of application Ser. No. 08/111,156, filed on Aug. 24 1993, now abandoned

BACKGROUND OF THE INVENTION

1. Field of the Invention

The present invention relates to a cartridge such as a disk cartridge for receiving therein in a rotatable manner a disk-like medium such as a flexible disk, a hard disk, particularly, an optical disk, an audio or a video cassette for receiving therein a tape-like medium, or a cartridge for a digital compact cassette, and a method of making a shutter for these cartridges.

2. Discussion of the Related Art

Generally, an information medium such as a disk-like medium (for instance, a magnetic disk, an optical disk or an optical-magnetic disk) or a tape-like medium is received in a casing in a form of a cartridge. The cartridge is used by setting it in a recording/reproducing device.

A conventional recording/reproducing medium has a drawback in that dust is easily deposited during handling which causes it to be easily damaged. Further, it is easily influenced by a change of temperature. Accordingly, a shutter is provided in the cartridge to open and close an opening such as a head insertion opening, a driving shaft insertion opening formed in the casing when it is in use or in non-use.

In a conventional method of making a cartridge wherein the shutters is slidably disposed on the casing to open and close the opening formed in the casing, a plurality of the shutter were successively formed from a metallic sheet. The shutters were connected with connecting portions at adjacent end portions of the shutters, and the connecting portions were cut at the final step of making the shutters. In the conventional method for producing the shutter, the cut portion projected from the end portion of each of the shutters. Accordingly, there were problems that a shutter stroke was determined by the cut portions, and the mounting or dismounting of the cartridge from the recording/reproducing device or the opening/closing movements of the shutter could not be smooth because the projection came into contact with a member such as a shutter opening/closing member in the recording/reproducing device. Therefore, it was necessary to precisely control a position where the projection was cut and also a post-treatment was necessary, whereby the manufacturing process was complicated, productivity was poor and reliability on the movement of the shutter was small.

In a case that the shutter was formed by injection-molding synthetic resin, a gate was formed at an end of the shutter and the gate was cut in a post-treatment so that a trace of the gate was not left on the surface of the shutter. Nevertheless, the cut portion was left projecting beyond the edge portion of the shutter. Accordingly, the same problems as the shutter made of metal took place.

SUMMARY OF THE INVENTION

It is an object of the present invention to provide a cartridge for a recording/reproducing medium and a method of making a shutter for the cartridge which permits easy determination of a stroke of the shutter and prevents a cut edge of the shutter from leaving, whereby assembling operations are improved, the sliding movement of the shutter can be smooth; fault of the operation of the disk can be eliminated; reliability is improved because of safety, and manufacture is easy and inexpensive.

According to the present invention, there is provided a cartridge for receiving a recording/reproducing medium which comprises a casing having an opening for exposing a part of the medium and/or an opening for permitting insertion of a driving shaft, and a shutter fitted slidably to the casing to open and close at least one of the openings, wherein the shutter is provided with a pair of recessed portions at the outer edges with respect to the direction of the sliding of the shutter.

Further, in accordance with the present invention, there is provided a method of making a shutter by successively pressing a metallic sheet, the shutter being slidably fitted to the casing of a cartridge for receiving therein a recording/reproducing medium to open and close an opening for exposing a part of the medium, and/or an opening for permitting insertion of a driving shaft, wherein the metallic sheet is punched out to form a series of shutters in a developed form wherein outer edges, with respect to the direction of the sliding of the shutter, of adjacent shutters are connected by each connecting portions;

recessed portions are formed at each of the outer edges near the connecting portions;

the connecting portions are cut to separate the adjacent shutters; and each of the separated shutters is bent in a substantially ⊐-like shape.

Further, in accordance with the present invention, there is provided a method of making a shutter by injection molding into a substantially ⊐-like shape, the shutter being slidably fitted to the casing of a cartridge for receiving therein a recording/reproducing medium to open and close an opening for exposing a part of the medium, and/or an opening for permitting insertion of a driving shaft, wherein recessed portions are formed at the outer edges with respect to the direction of the sliding of the shutter, and a gate for injection molding is provided in either of the outer edges.

DETAILED DESCRIPTION OF THE PREFERRED EMBODIMENTS

Figure 1:
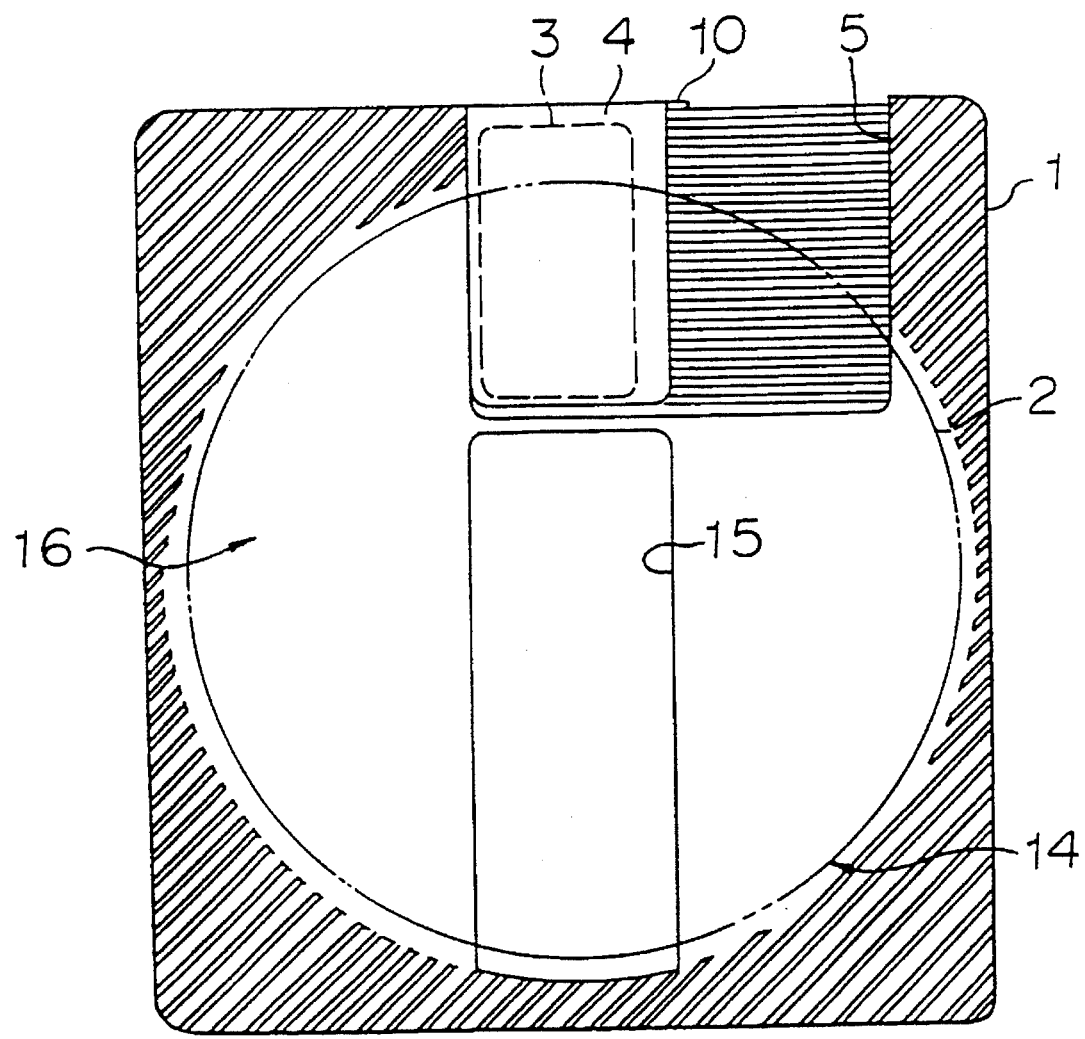
FIG. 1 is a front view showing an embodiment of the cartridge according to the present invention.

Preferred embodiments of the present invention will be described with reference to the drawings.

FIGS. 1 through 5 show an embodiment of a disk cartridge according to the present invention.

The disk cartridge comprises a casing for receiving therein a disk-like medium 2 as an information medium, in which an opening 3 such as a magnetic head insertion opening is formed, and a shutter 4 in a ⊐-like shape in cross section for opening and closing the opening 3. The casing 1 comprises an upper half casing and a lower half casing.

The shutter 4 has a sliding guide 10 having a generally ⊐-like shape in cross section. A guide pawl $10_1$ is inwardly extended from an edge of the ⊐-like sliding guide 10. The guide pawl $10_1$ is fitted to a slide groove formed in the outer surface of the casing 1. A pair of recessed portions 17 are formed in an outer edge 19 at right and left positions with respect to the sliding direction of the sliding guide 10. A projection is formed between the recessed portions 17 so that the projection 18 does not project beyond the outer edges 19 Of the ⊐-like sliding guide 10. In other words, the recessed portions 17 are located at or near an edge portion of the back surface of the ⊐-like sliding guide 10, and the free end of the projection 18, which is formed by cutting a metallic sheet, is determined so as not to project from the outer edge 19.

The positions of the recessed portions 17 in the ⊐-like shutter 4 can be determined such that they are formed symmetrically at the corner portions so that chamfering portions are formed at the corner portions (FIG. 3), or the recessed portions 17 are determined only at an intermediate area of an edge portion of the back surface of the ⊐-like shutter. A range of sliding of the shutter can be determined by the contact of the recessed portions 17 with a step (not shown) for fitting to the recessed portions, which is formed in the casing.

Figure 2:
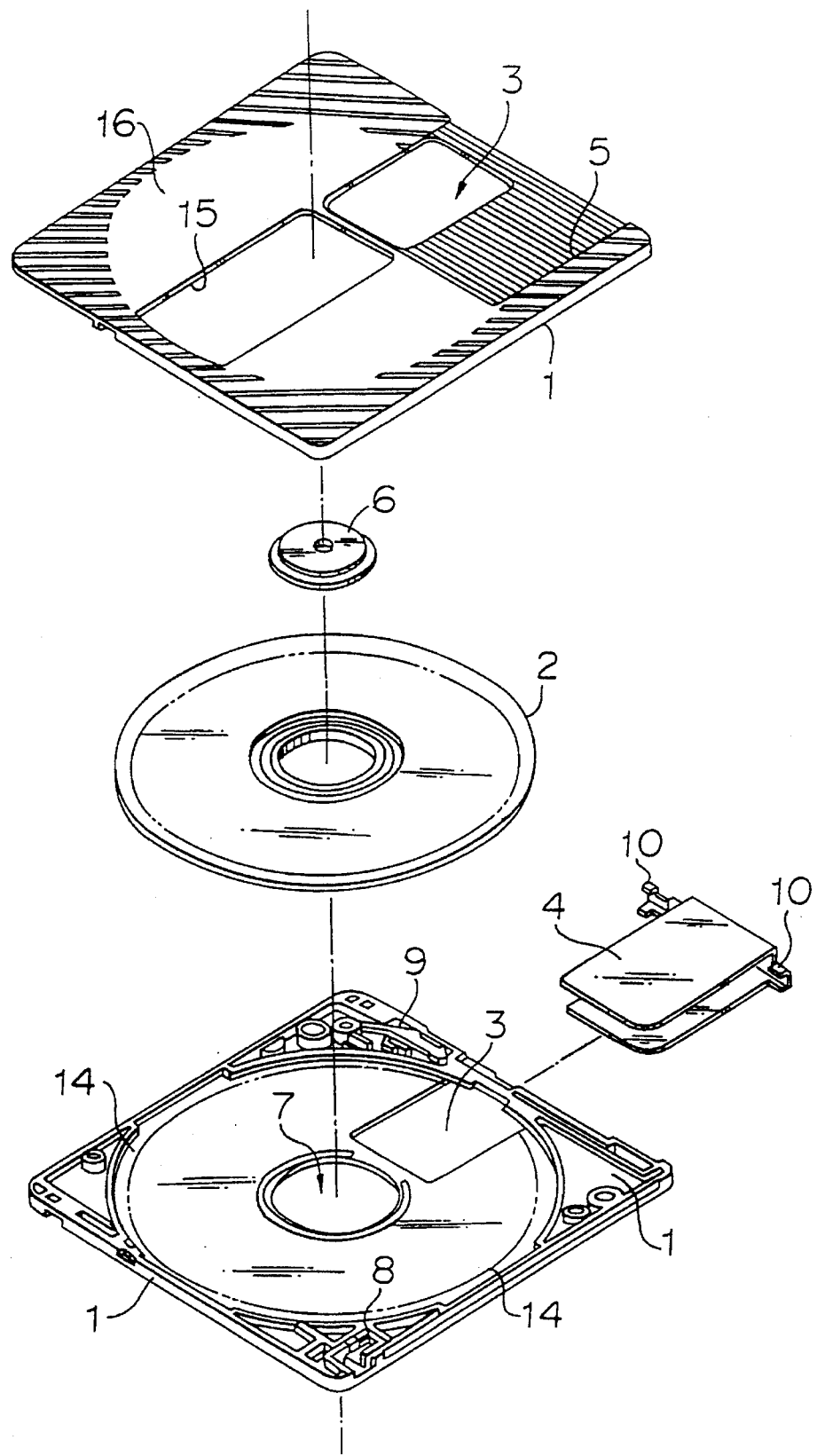
FIG. 2 is an exploded view of the cartridge shown in FIG. 1.
Figure 3:
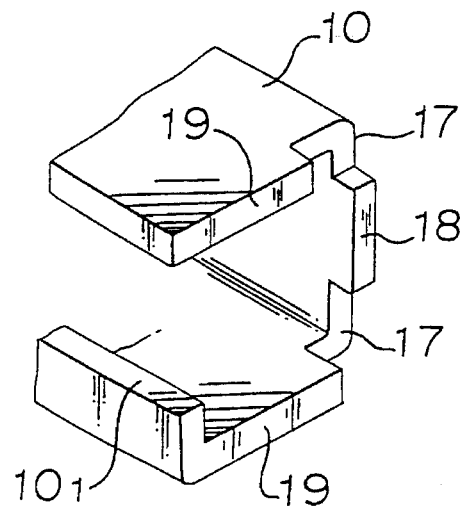
FIG. 3 is an enlarged perspective view partly broken of a shutter used for the cartridge shown in FIG. 1.
Figure 4:
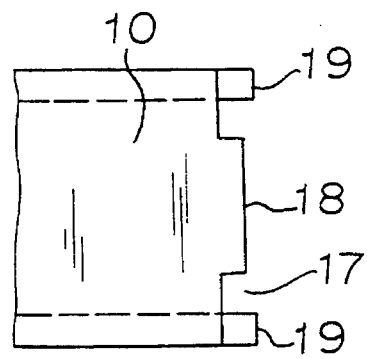
FIG. 4 is a front view partly omitted of the shutter shown in FIG. 3.
Figure 5:
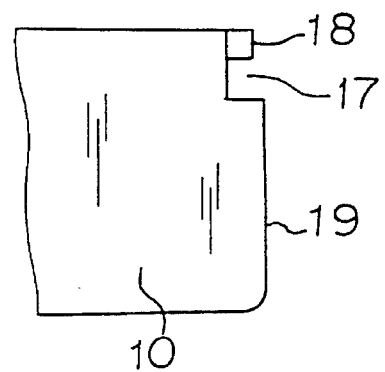
FIG. 5 is a side view of the shutter shown in FIG. 3.

In FIGS. 1 and 2, reference numeral 5 designates a shutter area having a recessed portion which is formed in the outer surface of the casing. The shutter area 5 permits the sliding of the ⊐-like shutter 4. Numeral 6 designates a clamping plate, numeral 7 designates a fitting hole for fitting a disk, numeral 8 designates an erasing-preventing plug, numeral 9 designates a shutter lock, numeral 14 designates a medium receiving portion, numeral 15 designates a label area and numeral 16 designates a visible portion.

The casing 1 may be in the form of a cartridge for receiving a disk-like medium such as floppy disk, compact disk, video disk, optical disk and so on, or for receiving a tape-like medium such as an audio, video or digital compact cassette.

The shutter 4 is formed by stamping and pressing a metallic sheet. The shutter 4 may have a round portion at an outer edge or a cut portion so as to eliminate an acute edge so that they can fit to a chamfering portion or a recessed portion in the casing, whereby the strength of the shutter can be increased to thereby improve reliability.

Figure 6:
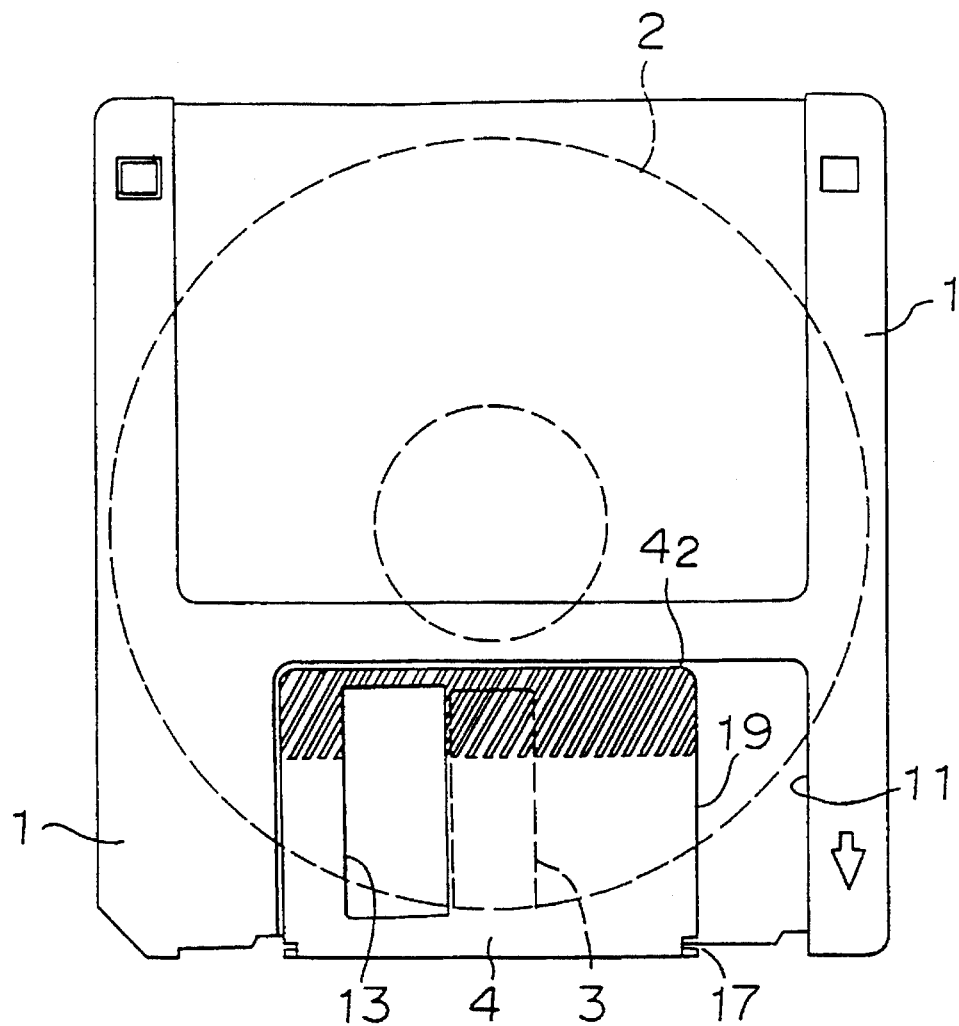
FIG. 6 is a front view of another embodiment of the cartridge according to the present invention.
Figure 7:
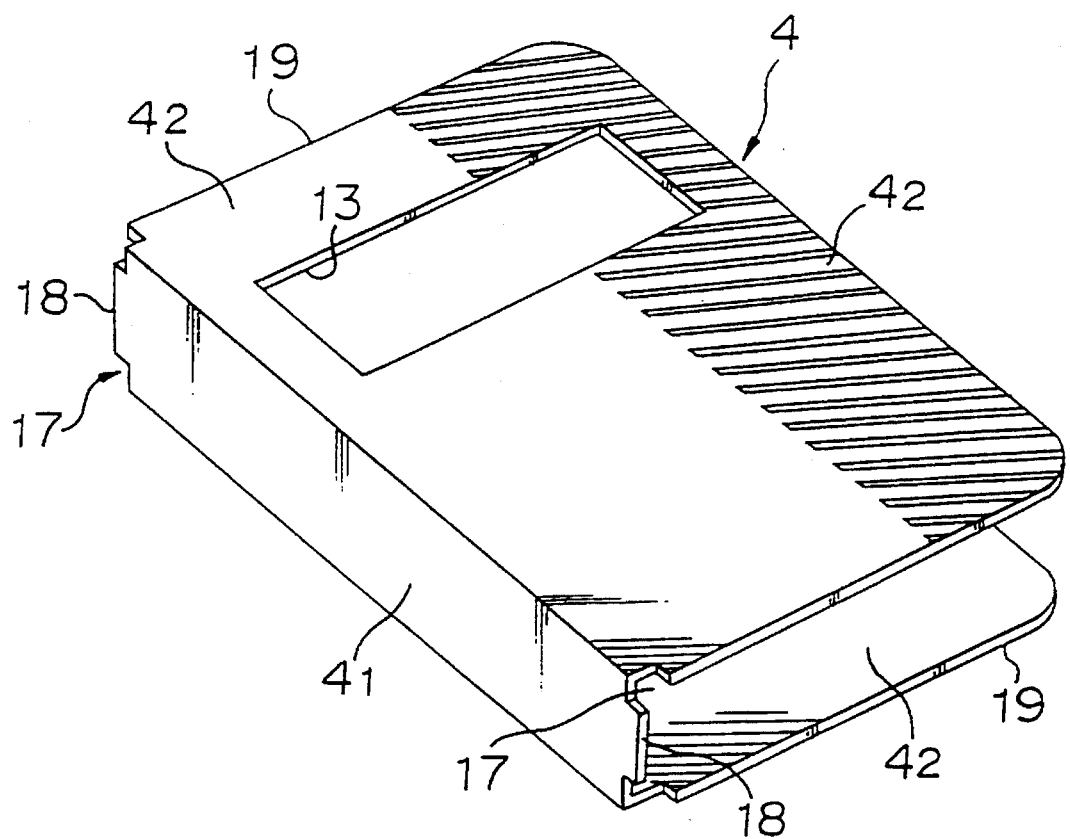
FIG. 7 is an enlarged perspective view of the shutter shown in FIG. 6.

FIGS. 6 and 7 shows a second embodiment of the cartridge which is used for receiving a floppy disk. The cartridge comprises the casing 1 for receiving the disk-like medium 2 and the shutter 4 in a substantially ⊐-like shape. A pair of recessed portions 17 are formed at both edges in the longitudinal direction of the back surface portion $4_1$ of the ⊐-like shutter 4 so that a projection 18 is formed between the pair of recesses 17. It is important that the free end of the projection 18 does not extend beyond the outer edges 19 of the upper and lower plates $4_2$, $4_2$ of the ⊐-like shutter 4. A window portion 13 is formed in each of the upper and lower plates $4_2$ of the ⊐-like shutter 4, and the shutter 4 is fitted slidably to a slide-area 11 of the casing 1 so as to open and close the opening 3 of the window portion 13 of the shutter.

The recessed portions 17 are preferably formed at the corner portions in outer edges of the back surface portion $4_1$ of the ⊐-like shutter 4 so as to prevent the shaving of the casing by the shutter during sliding movement. In a case that the shutter 4 is separated from a series of blanks of shutter in a developed form in a metallic sheet, the shutter 4 is separated at a cut portion which is inside the outer edges 19 of the upper and lower plates $4_2$ whereby each of the projections 18 which does not extend beyond the outer edge 19 can be formed.

Figure 8:
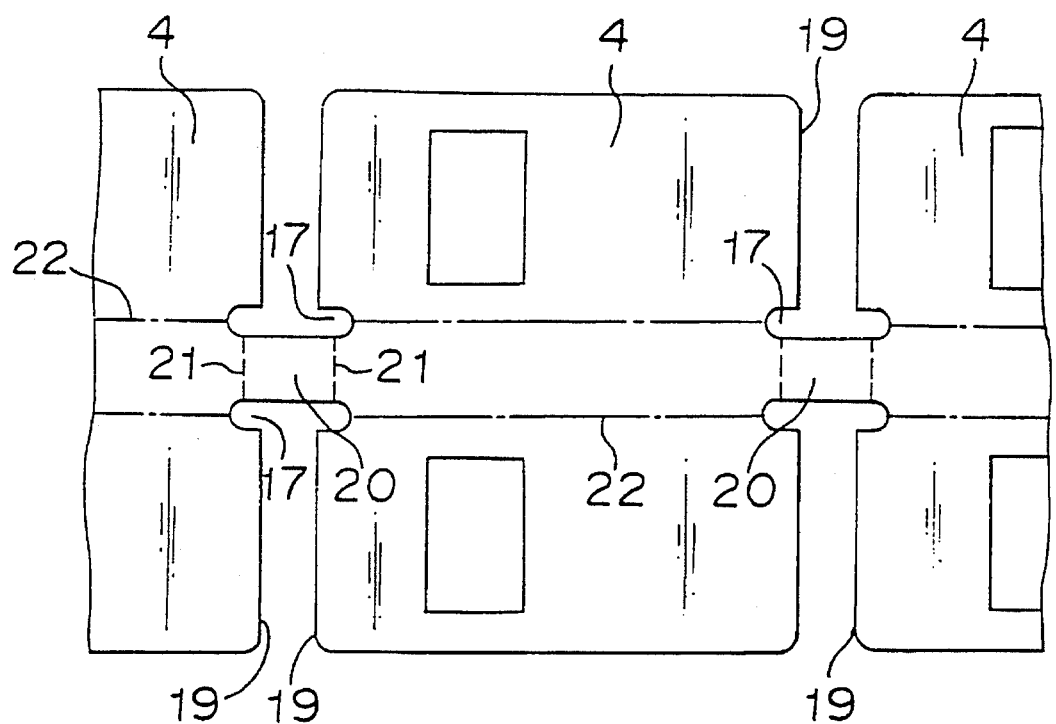
FIG. 8 is a plane view in a developed form of the shutter shown in FIG. 6 which is for illustrating a manufacturing step of the shutter.

The formation of the shutter 4 by stamping and pressing a metallic sheet is as follows. As shown in FIG. 8, a number of blanks of shutter which are connected with connecting portions 20 are punched out from the metallic sheet, wherein gaps are formed between the outer edges 19 of the adjacent shutters except for the connecting portions 20, and the recesses 17 are formed at the outer edges 19 and in the vicinity of the connecting portions 20. Each of the shutters are separated by cutting the connecting portions 20 along cutting lines 21 which are in parallel to the outer edges 19 and which are not beyond the outer edges 19. Then, each of the separated shutters is bent into a substantially ⊐-like shape in cross section along bending lines 22.

Figure 9:
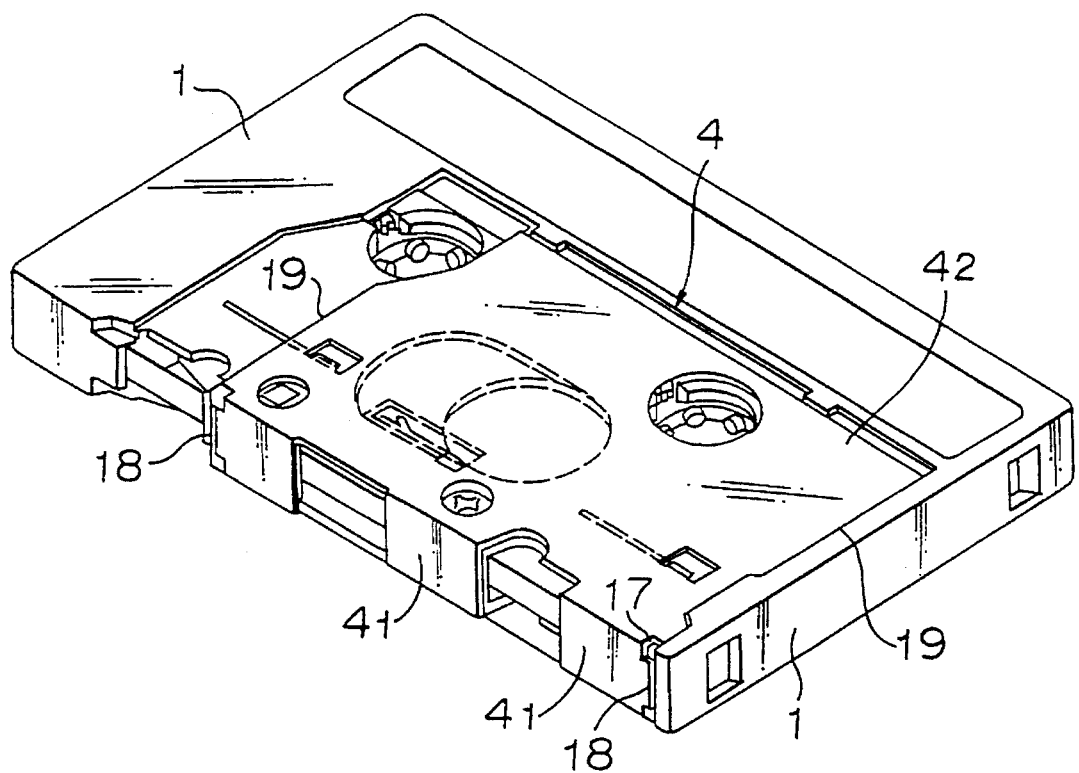
FIG. 9 is a perspective view of another embodiment of the cartridge according to the present invention.

FIG. 9 shows another embodiment of the cartridge for receiving a digital compact cassette (DCC). The cartridge comprises the casing 1 and the shutter 4 in a ⊐-like shape. The recessed portions 17 are formed at the corner portions of outer edges of upper and lower plates $4_2$, $4_2$ of the shutter 4, or at an intermediate portion of the outer edges 19 of the back surface $4_1$ of the ⊐-like shutter 4. In either case, a projection 18 is provided between the recessed portions 17 so that the free end formed by cutting the metallic sheet, of the projection 18 does not project from the outer edge 19 or the outer edges 19. By providing the free end of the projection 18 not to project beyond the outer edge 19, the free end of the projection 18 does not come to contact with the casing 1 when the shutter is slided.

Figure 10:
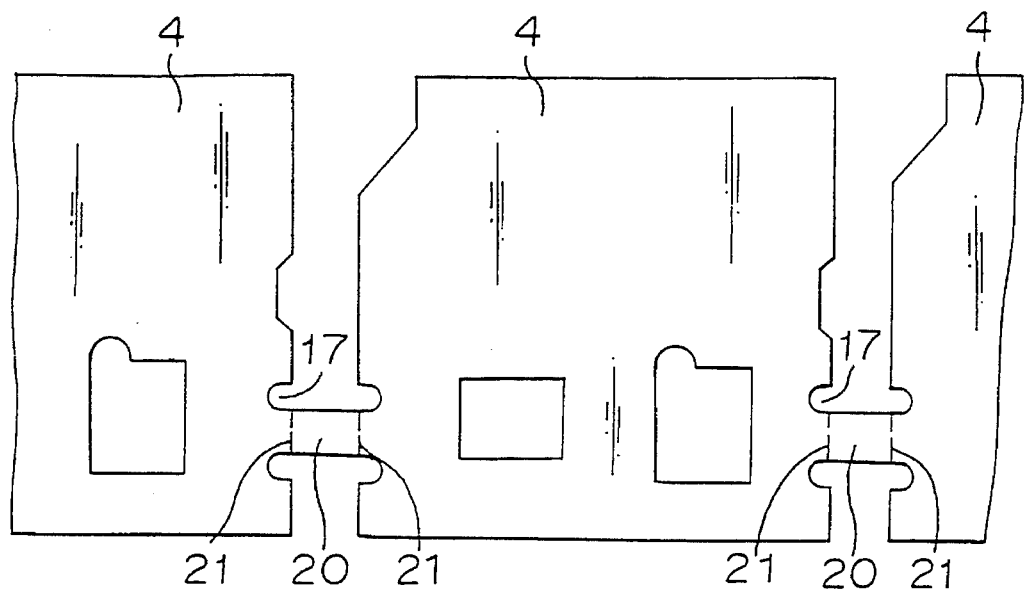
FIG. 10 is a plane view in a developed form of the shutter shown in FIG. 9 which is for illustrating a manufacturing step of the shutter.

In preparing the shutter 4, a series of shutters 4 are formed in the same as the above (FIG. 10), and the recessed portions 17 are formed at the outer edges of the shutters 4 and in the vicinity of the connecting portions 20, followed by cutting away along cutting lines 21.

Figure 11:
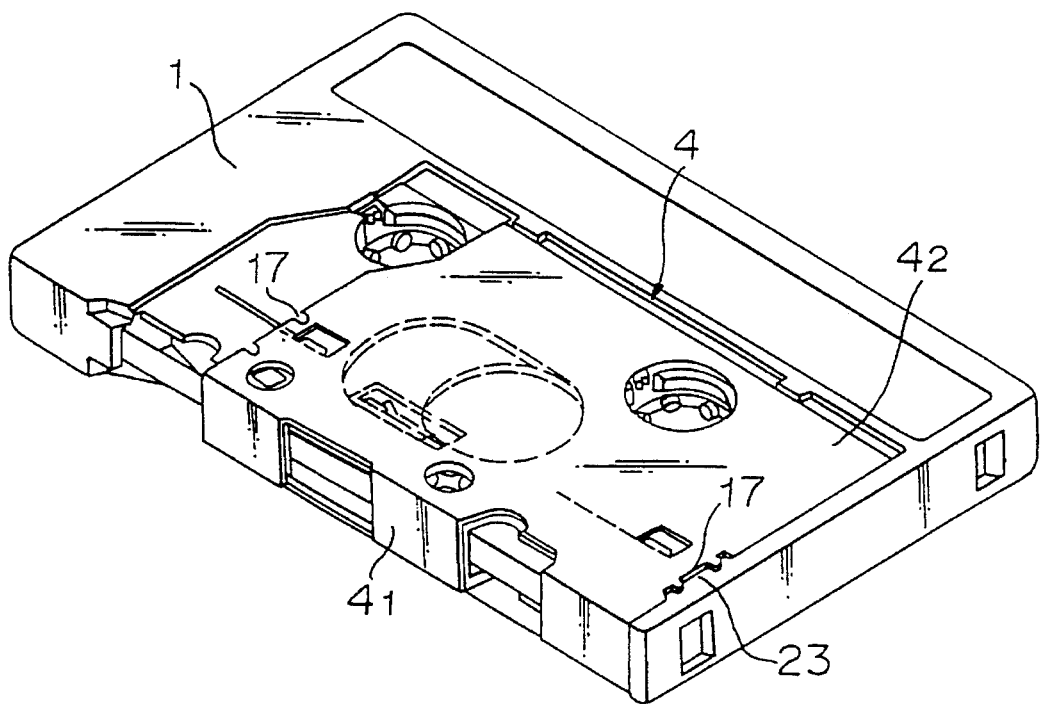
FIG. 11 is a perspective view of another embodiment of the cartridge according to the present invention.

In an embodiment shown in FIG. 11, the recessed portions 17 are formed at both outer edges of the shutter 4, and a step portion 23 is formed in the casing 1 so as to be fitted to the recessed portions 17, whereby the movement of the shutter 4 in the sliding direction can be controlled.

Figure 12:
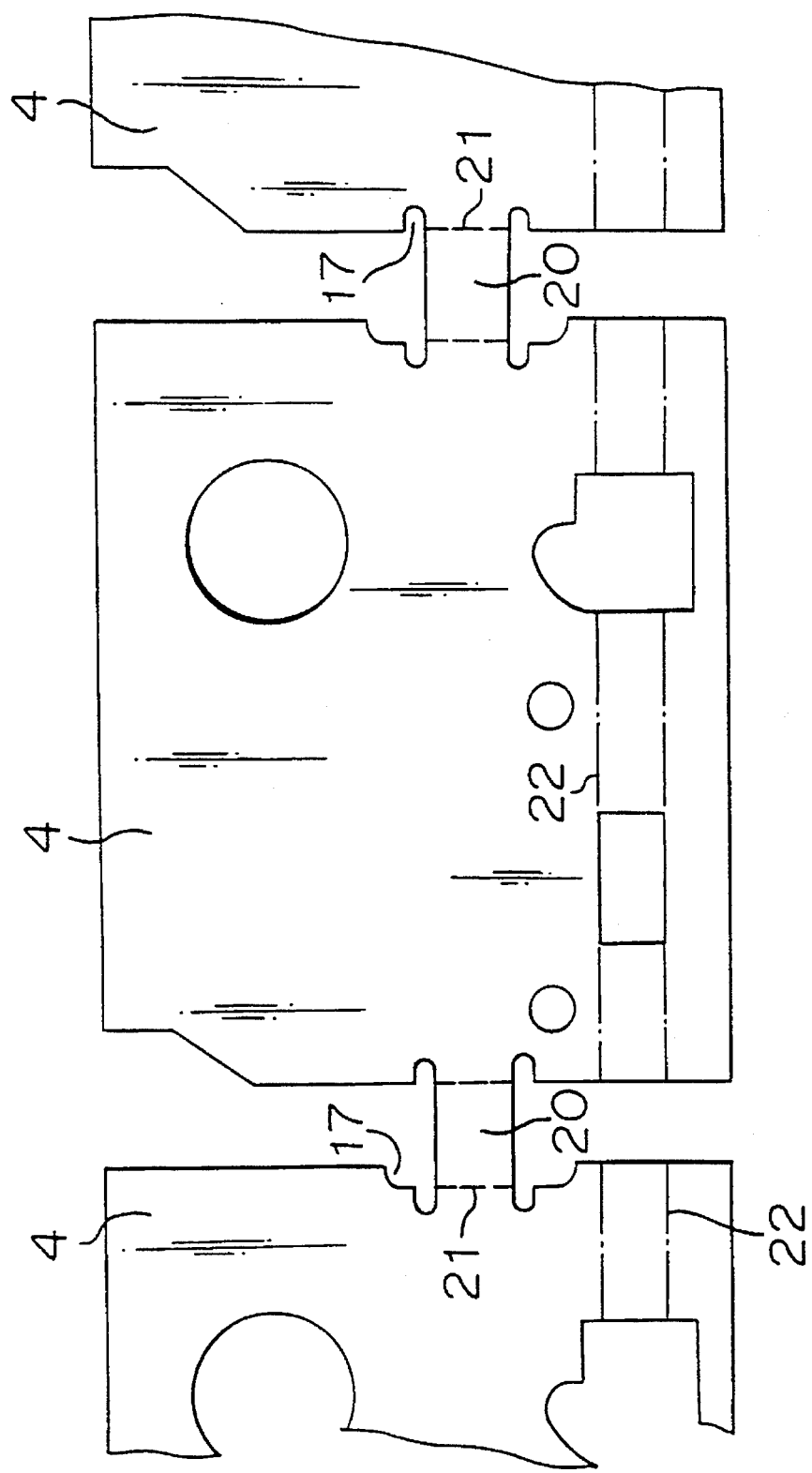
FIG. 12 is a plane view in a developed form of the shutter shown in FIG. 11 which is for illustrating a manufacturing step of the shutter.

As shown in FIG. 12, a series of the shutters 4 which are connected with connecting portions 20 located between the pair of recessed portions 17 are punched out from a metallic sheet. Then, the shutters 4 are separated by cutting away along cutting lines 21. Then, the shutter is bent into a substantially ⊐-like shape along bending lines 22 which are positioned apart from the recesses 17.

The shape of the recessed portions 17 may be in a stepwisely recessed shape 17₁ as shown in FIG. 12. In this case, a step portion 23 having the corresponding shape is formed in the casing.

In the above-mentioned embodiments, since the free end of the projection which is formed by cutting away the connecting portion in the manufacturing process of the shutter does not project from the recessed portion, the projection does not come to contact with the casing in the sliding movement of the shutter; there is no danger of faulty movement of the shutter, and safe and smooth opening and closing movement can be assured. Further, there is little possibility of damaging the casing, or producing powder due to the touching or the shaving of the shutter to the casing in the sliding movement. A trouble in recording or reproducing such as dropout can be prevented and reliability can be greatly improved. Further, in the determination of a range of sliding of the shutter, there is no error and the range can be easily determined. It is no longer necessary to precisely control the position of cutting and to conduct post-treatment such as surface cutting. The quality of the cartridge and the durability can be improved as well as easy manufacturing and low manufacturing cost.

Figure 13:
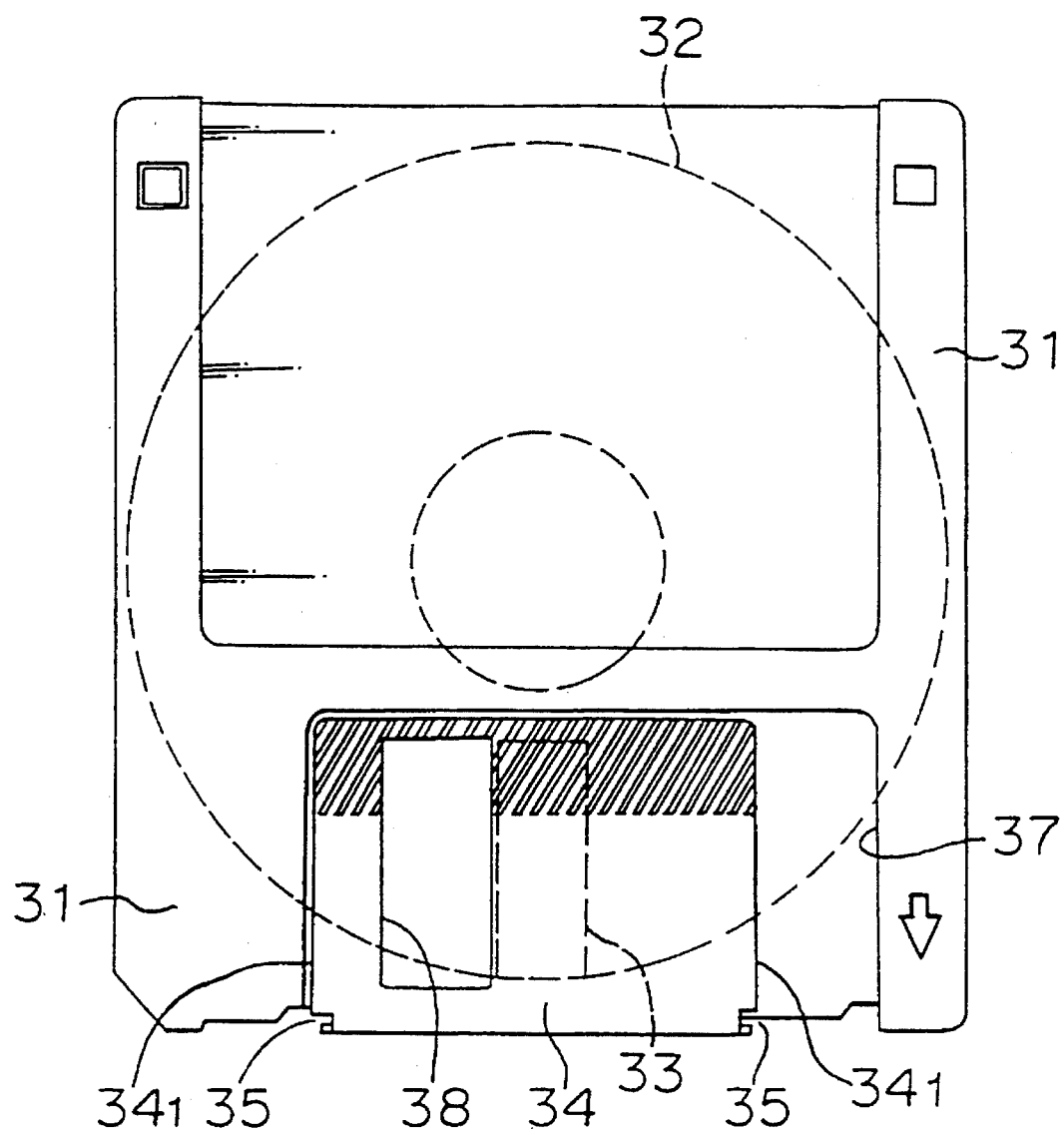
FIG. 13 is a front view of another embodiment of the cartridge according to the present invention.
Figure 14:
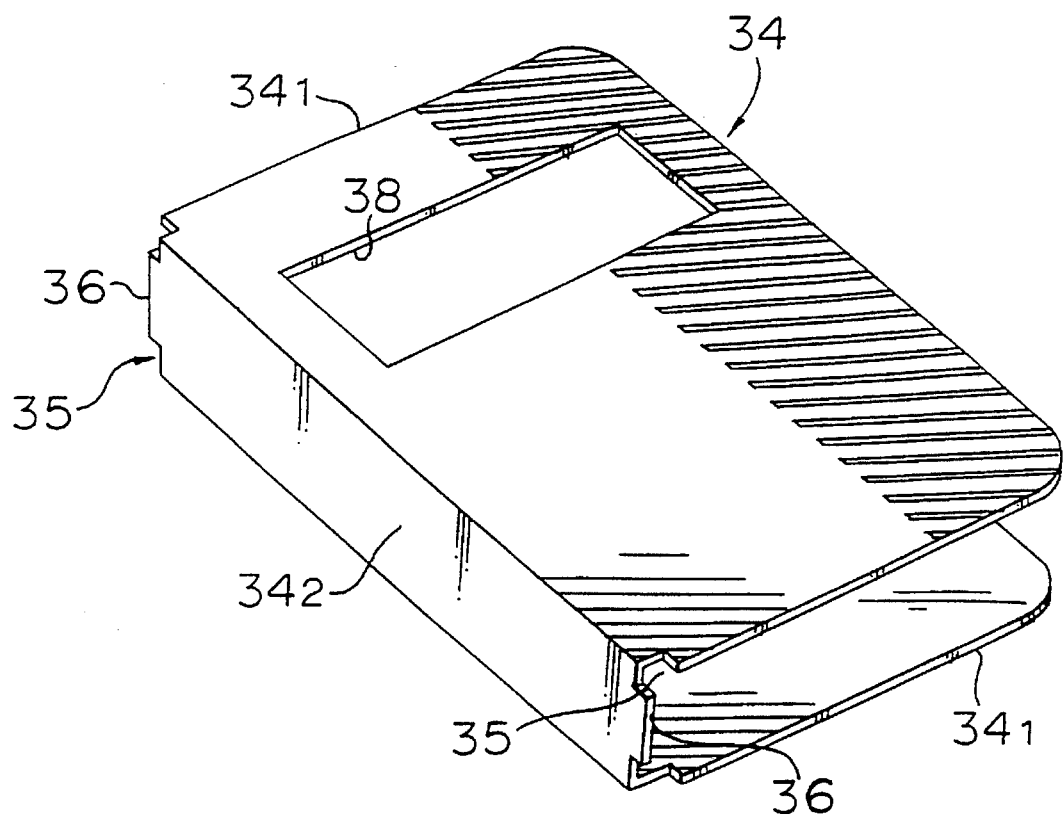
FIG. 14 is an enlarged perspective view of the shutter shown in FIG. 13.
Figure 15:
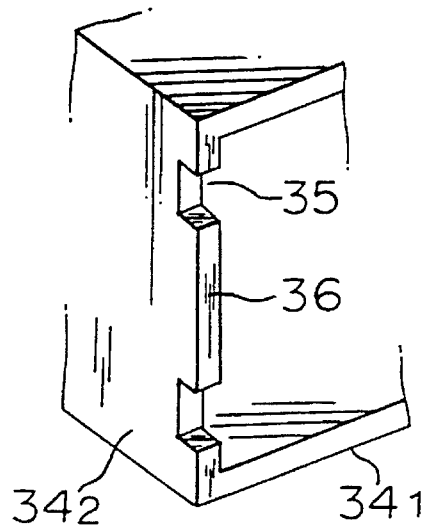
FIG. 15 is an enlarged perspective view partly omitted of another embodiment of the shutter shown in FIG. 14.

FIGS. 13 through 15 show another embodiment of the disk cartridge of the present invention. The cartridge comprises a casing 31 for receiving therein a disk-like medium 32 and a substantially ⊐-like shaped shutter 34. The casing 31 has an opening 33 for exposing a part of the recording surface of the medium 32 and/or an opening for permitting insertion of a driving shaft. The shutter 34 is slidability fitted to the casing 31 so as to open and close at least one of the openings. The shutter 34 is formed by injection-molding synthetic resin.

As shown in FIGS. 14 and 15, a pair of recessed portions 35 are formed at outer edges 34₁ in the direction of sliding of the shutter 34. A gate 36 for injecting molding is provided between the pair of recessed portions 35 so that the free end of the gate 36 does not extend from either of the outer edges 34₁.

As shown in FIG. 13, the recessed portions 35 are formed at the corner portions at both ends of each outer edge of the back surface portion 342 of the substantially ⊐-like shutter 34 so that chamfering portions are formed. However, the recessed portions 35 may be formed at other portions of the outer edge of the back surface portion 34₂ as shown in FIG. 15. Further, a step portion (not shown) may be formed in the casing at the position corresponding to the recessed portions 35 so that a range of sliding of the shutter is determined by fitting the step portion to the recessed portions.

In FIG. 13, numeral 37 designates a shutter area which has a recessed surface in which the ⊐-like shutter 34 is slidably fitted. Numeral 38 designates a window opening.

The casing 31 may be formed as a cartridge to receive a disk-like medium such as a floppy disk, compact disk, video disk, optical disk or the like, or to receive a tape-like medium such as an audio, video, or digital compact cassette.

The shutter 34 may have a round portion at an outer edge to thereby eliminate an acute edge portion, or may have a chamfering portion so that it corresponds to a chamfering portion or a recess formed in the casing, whereby the strength of the shutter can be increased and reliability is improved.

In this embodiment, the shutter is formed by injection-molding synthetic resin. An injection-molding method required a gate through which synthetic resin is injected. In this embodiment, the gate 36 is provided in and between the recessed portions 35 which are formed at the outer edge in the direction of the sliding of the shutter. The recessed portions 35 may be formed in any portion of the shutter. Further, the shutter may not have the ⊐-like shape.

In a case of a digital compact cassette which has two side plate portions in which one side plate portion is smaller than the other, the recessed portions are preferably formed in the larger one.

Figure 16:
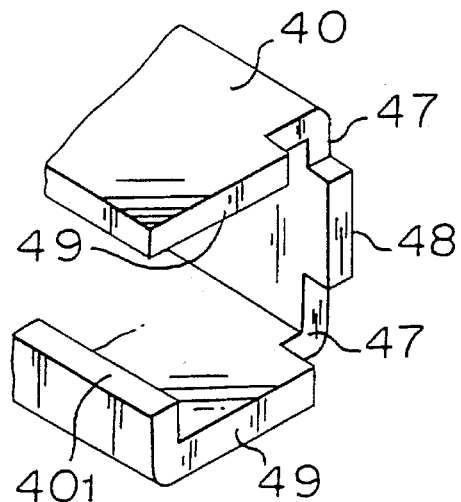
FIG. 16 is an enlarged perspective view partly omitted of an embodiment of the shutter of the present invention.
Figure 17:
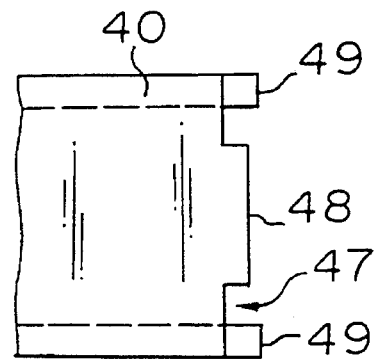
FIG. 17 is a front view of the shutter shown in FIG. 16.
Figure 18:
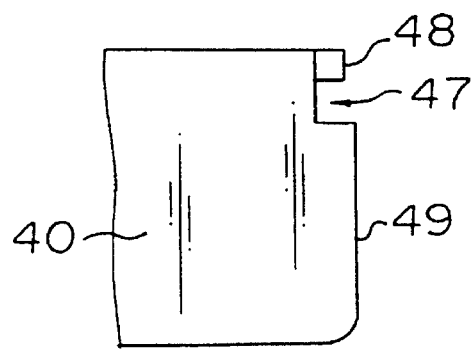
FIG. 18 is a side view of the shutter shown in FIG. 16.

FIGS. 16 through 18 shows a sliding guide 40 according to another embodiment of the present invention. The sliding guide 40 has a substantially ⊐-like shape in cross section, and a guide pawl 401 is formed at an edge in the longitudinal direction of the sliding so as to extend inwardly. The guide pawl 401 is fitted to a slide groove formed in an outer surface of the casing. A pair of recessed portions 47 are formed at both corners of the outer edge of the sliding guide 40 in the direction of the sliding so that a gate 48 is formed in or between the recessed portions so as not to extend from the outer edge 49, in other words, the gate 48 does not project from the outer edge 49.

Figure 19:
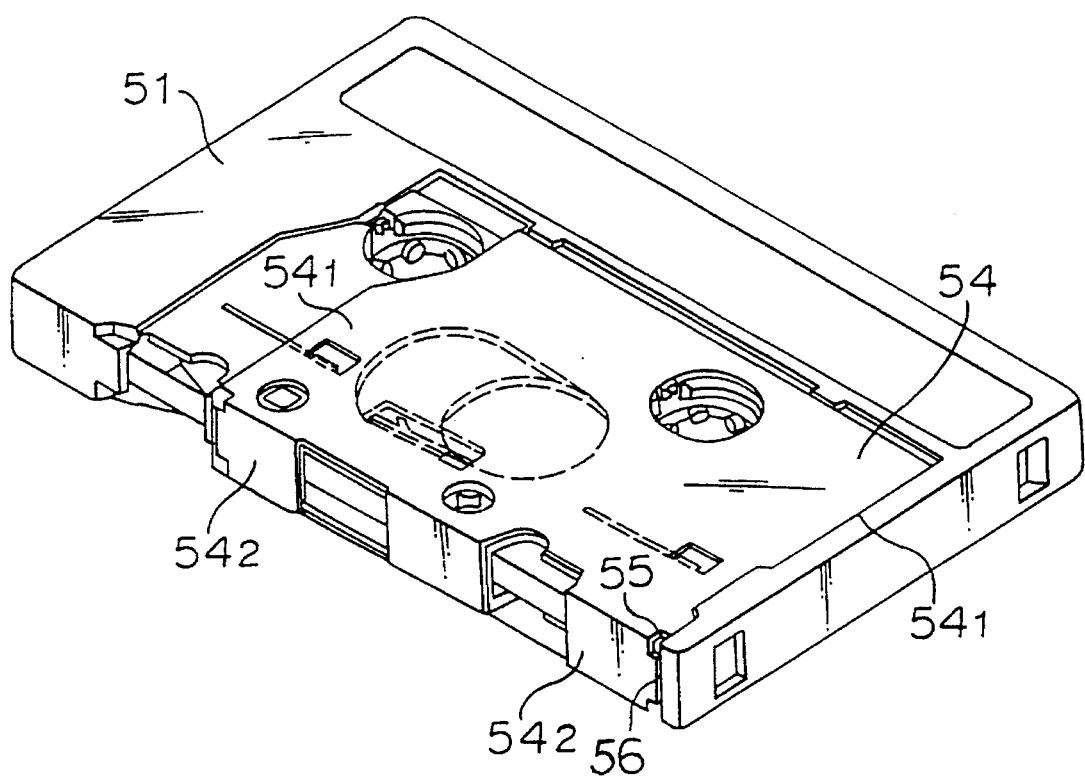
FIG. 19 is a perspective view of an embodiment of the cartridge according to the present invention.

FIG. 19 shows another embodiment of the cartridge for receiving a digital compact cassette (DCC). A shutter 54 having a substantially ⊐-like shape is slidably fitted to a casing 51. A pair of recessed portions 55 are formed at both ends of the outer edge of the upper and lower plates of the ⊐-like shutter 54 so that the gate 56 is in and between the recessed portions 55, in other words, the gate does not extend beyond the outer edge 54₁ of the back surface portion 54₂ of the ⊐-like shutter 54. Accordingly, the gate does not come to contact with the casing 51 in the opening and closing operation of the shutter 54.

A step portion may be formed in the casing 51 so as to be fittable to the recessed portions 55 of the shutter 54. In such arrangement, the gate 56 is provided at a position so as to control the sliding movement of the shutter 54.

The embodiments shown in FIGS. 13 through 19 provide the same function and effect as the embodiments shown in FIG. 1 through 12.

We claim:

1. A cartridge for receiving a recording/reproducing medium, the cartridge comprising:

a casing having a recess and at least one opening formed at the recess through which a part of the medium is exposed, said recess having oppositely positioned first and second facing end surfaces; and a shutter slidably fitted in the recess of the casing so as to be flush with an outer surface of the casing and slidable between the first and second facing end surfaces of the recess to open and close said opening, said shutter comprising oppositely positioned first and second side portions, each of said first and second side portions of said shutter comprising a contacting side surface and a cut portion which respectively face said first and second facing end surfaces of said recess, the cut portion of each of said first and second side portions of said shutter comprising a projecting intermediate surface and a pair of recessed at opposite sides of said projecting intermediate surface;

wherein each of said contacting side surfaces of said shutter project beyond each of said projecting intermediate surfaces with respect to a sliding direction of said shutter on the casing, such that when the shutter is slid to one of said first and second facing end surfaces of said recess, the contacting side surfaces of said shutter which face said one of said first and second facing end surfaces of said recess contacts said one of said first and second facing end surfaces of said recess, and a gap is maintained between said one of said first and second facing end surfaces of the recess and the projecting intermediate surface of said cut portion which faces said one of said first and second facing end surfaces of the recess, to reduce a damage to the casing by the cut portion of the shutter and permit each of said contacting side surfaces of the shutter to determine a shutter stroke of said shutter within said recess.

2. The cartridge according to claim 1, wherein said shutter is in ⊐-like shape.

3. The cartridge according to claim 1, wherein the shutter is made of a metallic sheet.

4. The cartridge according to claim 1, wherein the shutter is a molded product of resin.

* * * * *